United States Patent
Liu et al.

(10) Patent No.: US 6,914,596 B2
(45) Date of Patent: Jul. 5, 2005

(54) PERSONAL DIGITAL ASSISTANT WITH RETRACTABLE STYLUS

(75) Inventors: Chen-Kuang Liu, Taoyuan (TW); Ching-Shih Chen, Taipei (TW); Sheng-Ming Liu, Junghe (TW)

(73) Assignee: High Tech Computer, Corp., Taoyuan (TW)

( * ) Notice: Subject to any disclaimer, the term of this patent is extended or adjusted under 35 U.S.C. 154(b) by 300 days.

(21) Appl. No.: 10/247,706

(22) Filed: Sep. 20, 2002

(65) Prior Publication Data

US 2003/0067453 A1 Apr. 10, 2003

(30) Foreign Application Priority Data

Oct. 5, 2001  (TW) ......................................... 90124762 A

(51) Int. Cl.[7] ............................................. B43K 29/00
(52) U.S. Cl. ........................ 345/179; 345/156; 345/173; 178/19.01; 401/99; 401/103; 401/109; 401/112; 401/258
(58) Field of Search ................................ 345/156, 173, 345/179, 182; 178/19.01, 19.02, 19.03, 19.04, 19.05; 401/99, 103, 109, 112, 258; 361/686; 455/90, 556, 575

(56) References Cited

U.S. PATENT DOCUMENTS 3,749,503 A * 7/1973 Duerr .......................... 401/195
5,330,899 A * 7/1994 DeVaughn .................... 435/30
5,422,442 A * 6/1995 Gouda et al. ............. 178/19.01
6,050,735 A * 4/2000 Hazzard ........................ 401/33
6,250,828 B1 * 6/2001 Liu ................................ 401/6
6,681,333 B1 * 1/2004 Cho ............................ 713/300

FOREIGN PATENT DOCUMENTS

CN          85203983 U       9/1986

* cited by examiner

*Primary Examiner*—Bipin Shalwala
*Assistant Examiner*—Vincent E. Kovalicvk
(74) *Attorney, Agent, or Firm*—Rabin & Berdo P.C.

(57) ABSTRACT

A Personal Digital Assistant (PDA) with retractable stylus comprises a retractable stylus, a housing, a stylus slot, and a push portion, wherein a contact pad is attached to the inner side of the push portion. The retractable stylus comprises a pen shaft having a release button, a pen body having an opening, and a spring situated inside the pen body. When an external force is applied to the pen shaft downward, the spring is compressed until the opening holding the release button; thus, the stylus is shortened. When the release button is set free from the opening, the spring elasticity ejects the pen shaft upward; thus, the stylus returns to the full-length condition. If the stylus is kept in the stylus slot, an external force applied to the push portion can make the contact pad press the release button; so the pen shaft is ejected upward by spring elasticity.

10 Claims, 4 Drawing Sheets

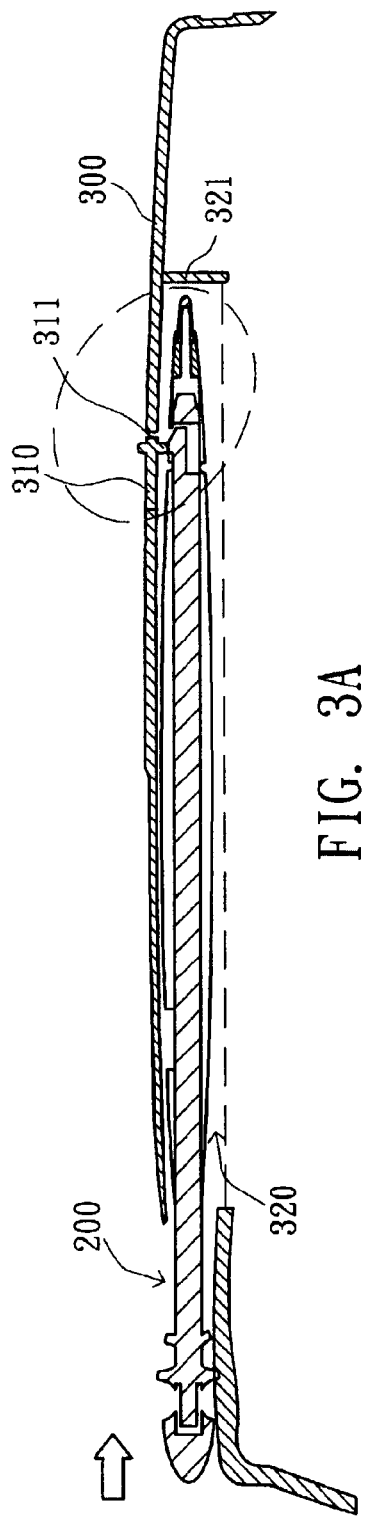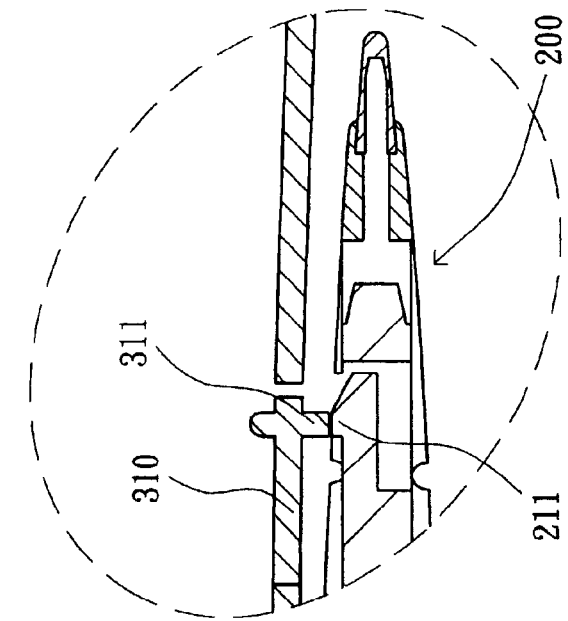
FIG. 3A
FIG. 3B

PERSONAL DIGITAL ASSISTANT WITH RETRACTABLE STYLUS

BACKGROUND OF THE INVENTION

This application incorporates by reference Taiwanese application Serial No. 90124762, filed Oct. 5, 2001.

1. Field of the Invention

The invention relates in general to a stylus applicable to a Personal Digital Assistant (PDA), and more particularly to the PDA with retractable stylus.

2. Description of the Related Art

Today, computer, communication, and consumer (3C) products play an important role in the worldwide electronic industries. Since the life circle of modern electronic products is short, the trend of the modern product is toward a handy design, which possesses the less weight and good mechanical strength. With rapid development of the 3C products, the future market demands will be massive for the portable products, such as laptop PCs, cellular phones, Personal Digital Assistants (PDA), etc. Therefore, efficient use of space has become a key factor in the development of light and handy portable products.

Please refer to FIG. 1, which depicts a conventional PDA with a stylus. Generally, the stylus 100 is designed in a certain length for comfortable use, and it is not too short. Hence, a considerable space in the PDA 110 is occupied for receiving the stylus 100. In the PDA commercial market, every inch taken by the components or accessories has a considerable effect on the PDA layout, and consequently impacts the overall PDA size.

According to the aforementioned illustration, it is known that conventional PDA stylus design did not save space, and still has a plenty of room for improvement. How to reduce the size of a PDA without trailing off its own functions is a very important subject for the manufactures and related industries.

SUMMARY OF THE INVENTION

It is therefore an object of the invention to provide a Personal Digital Assistant (PDA) with retractable stylus, in which the space occupied by the retractable stylus of the invention is greatly reduced. Also, the retractable design is more convenient for the user to take the stylus out.

According to the objective of the invention, the PDA with retractable stylus comprises a retractable stylus, a housing, a stylus slot for receiving the stylus, the retaining component to position the stylus, and the push portion attached with a contact pad in the inner side. The retractable stylus comprises a pen shaft, a pen body connected to the pen shaft, and a spring situated inside the pen body. Also, an opening formed on the pen body can hold a release button formed on the pen shaft. Two ends of the spring respectively touch the pen shaft and the pen body for providing an ejecting force to extend the stylus.

When an external force is applied to the pen shaft, the spring is compressed until the opening holding the release button, thus the stylus is shortened. When the release button is set free from the opening, the spring elasticity ejects the pen shaft upward. Additionally, a contact pad attaching to inner side of the push portion is positioned near the release button while the stylus is kept in the stylus slot. If an external force is applied to the push portion, the contact pad is going to press the release button. The pen shaft is hence ejected upward by the spring elasticity.

Technically, the PDA with retractable stylus of the invention is user friendly. When the stylus is inserted into the stylus slot, it can be shortened by an external force. When the release button is pressed and set free from the opening, the stylus is automatically extended due to the spring elasticity. It is very convenient for the user to hold and operate the stylus in full length.

Other objects, features, and advantages of the invention will become apparent from the following detailed description of the preferred but non-limiting embodiment. The following description is made with reference to the accompanying drawings.

BRIEF DESCRIPTION OF THE DRAWINGS

FIG. 3A shows the stylus of the invention received inside a PDA; and

FIG. 3B is a partially enlarged view of the stylus in FIG. 3A.

DETAILED DESCRIPTION OF THE INVENTION

In the present invention, a retractable stylus applied in the Personal Digital Assistant (PDA) is disclosed. The retractable stylus includes a pen shaft, a pen body and a spring. A release button is formed on the pen shaft while an opening is formed on the pen body. The release button can be held by the opening. The spring is situated inside the pen body for providing an ejecting force for the pen shaft. When there is an external force applied to the pen shaft, the spring is compressed resulting in the retraction of the stylus. The pen shaft keeps slipping in the pen body until the opening holding the release button. Thus, the stylus is shortened. The shortened stylus has the packing advantage for the PDA. If an external force applied to the release button, the opening unlocks the release button and the spring elasticity ejects the pen shaft upward. The stylus in full length is convenient for users to hold and operate.

In this invention, the retractable stylus is received in the stylus slot of PDA. When the stylus is inserted into the stylus slot, the pen shaft can be pressed downward until the opening holding the release button. Hence, the stylus is shortened. When the stylus needs to be removed from the stylus slot, the release button is set free from the opening first. Then, the spring elasticity extends the stylus to the original state. Accordingly, this retractable stylus is designed not only for saving space but also for comfortable use.

Simply saying, when the stylus is not in use and inserted in the stylus slot, it can be shortened to a predetermined length. When the opening unlocks the release button, the stylus can be extended to a full length and easily removed from the stylus slot. The details are further described in the following paragraphs.

Figure 1:
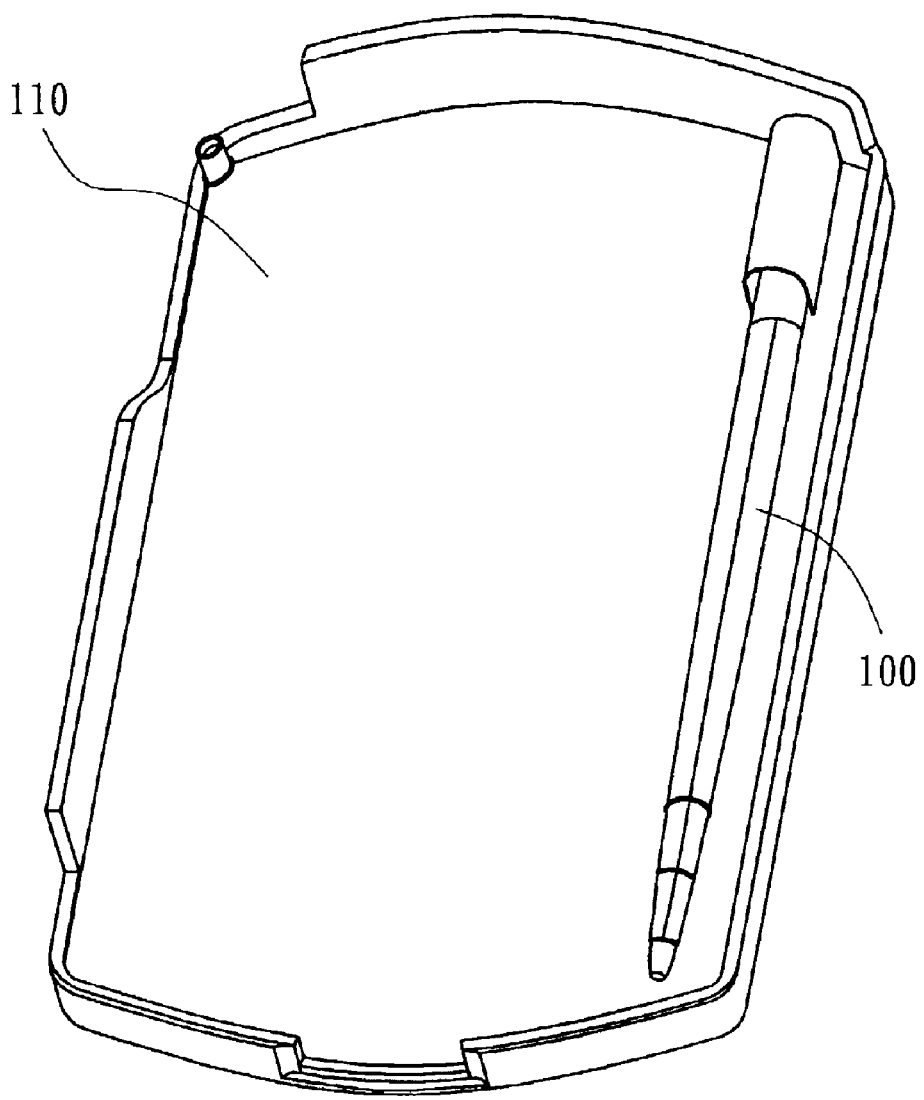
FIG. 1 (prior art) depicts a conventional PDA with a stylus.
Figure 2A:
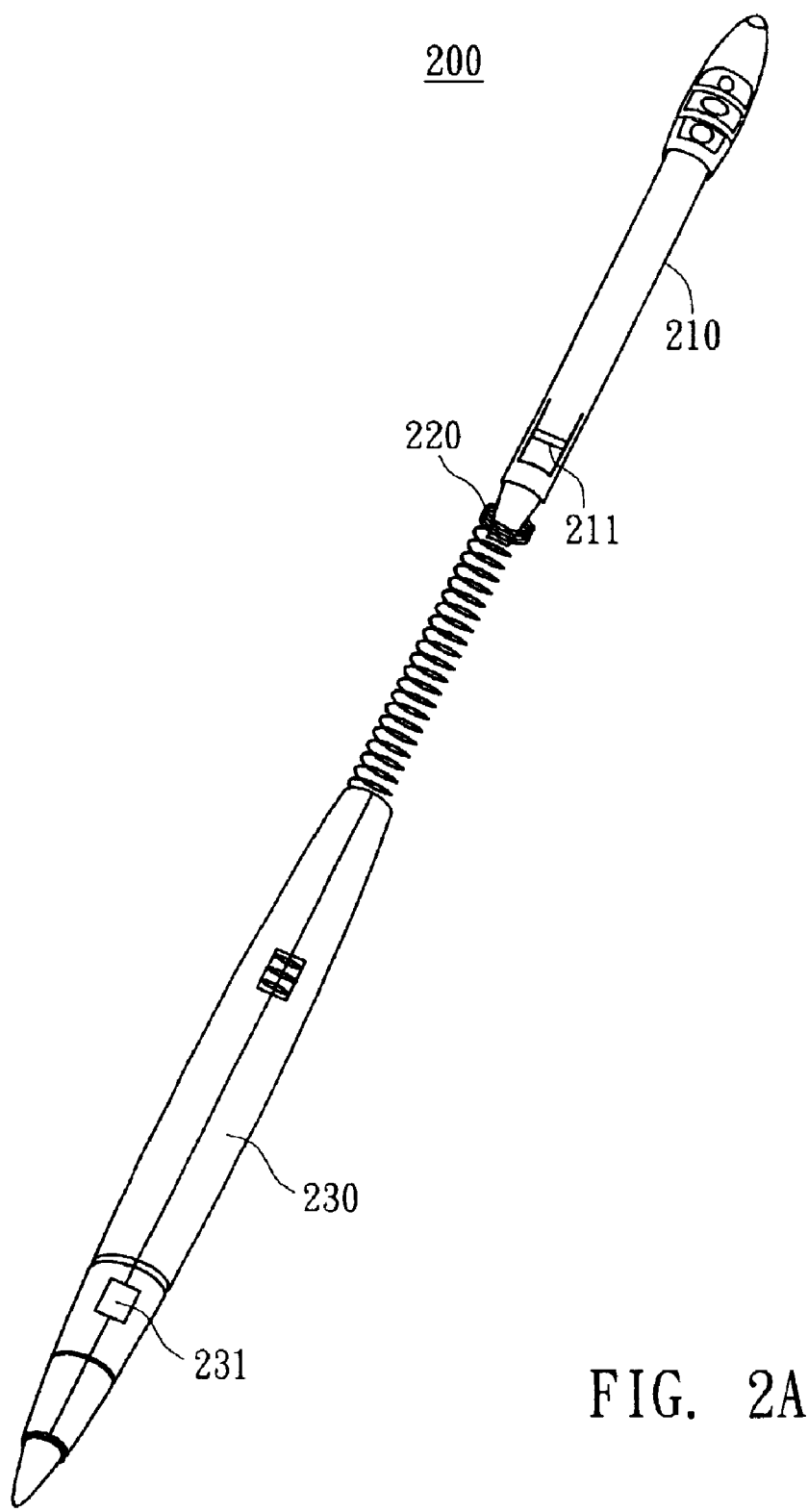
FIG. 2A is an exploded drawing of a retractable stylus according to the preferred embodiment of the invention.

Please refer to FIG. 2A, which is an exploded drawing of a retractable stylus according to the preferred embodiment of the invention. The stylus 200 includes a pen shaft 210, a spring 220, and a pen body 230. There is a release button 211 on the pen shaft 210. An opening 231 formed on the pen body 230 is designed for holding the release button 211 if the pen shaft 210 is slipped downward in the pen body 230 to a predetermined position. The spring 220 is situated inside the pen body 230, and two ends are against the pen shaft 210 and the pen body 230 for providing the retractility of the stylus 200. Also, a tip for taping the icons and buttons on the PDA screen is attached to one end of the pen body 230.

Figure 2B:
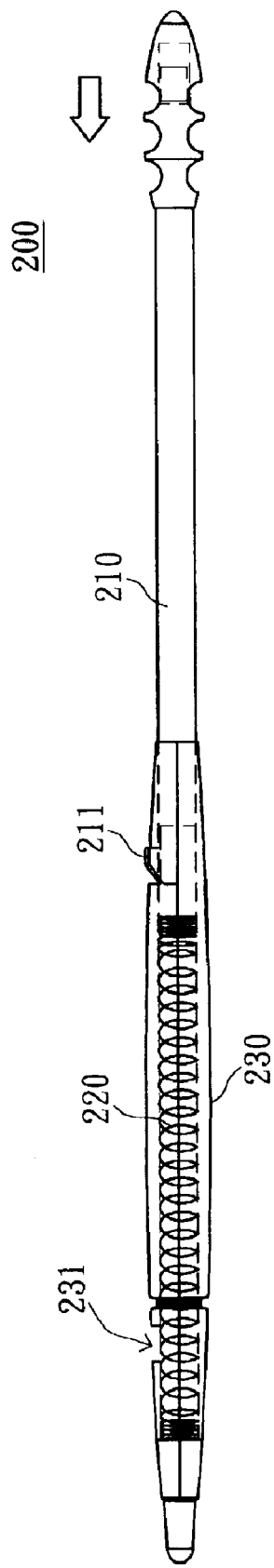
FIG. 2B shows the stylus of the invention in the released condition.
Figure 2C:
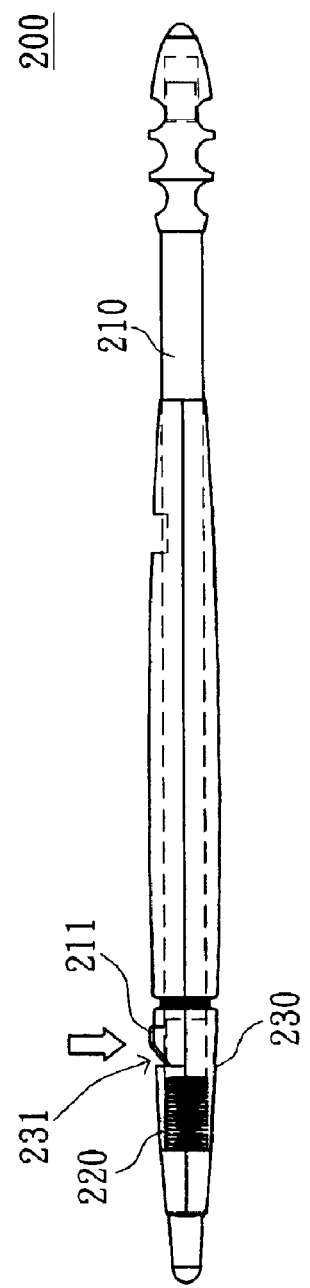
FIG. 2C shows the stylus of the invention in the compressed condition.

FIG. 2B shows the stylus of the invention in the released condition. FIG. 2C shows the stylus of the invention in the compressed condition. As shown in FIG. 2B and FIG. 2C, the cross sectional view of the release button 211 is trapeziform, and this makes it move more smoother and easier inside the pen body 230. When an external force is applied to the pen shaft 210 along the arrow direction in FIG. 2B, the spring 220 pushed by the pen shaft 210 is compressed until the opening 230 holding the release button 211. consequently, the stylus of the invention is shortened. If a full-length stylus is needed, an external force is applied on the release button 211 along the arrow direction in FIG. 2C, and the pen shaft 210 will be pop-up due to the spring elasticity.

According to the foregoing description, it is known that the stylus 200 of the invention is retractable, and the shortened length depends on the positions of the release button 211 and the opening 231 correspondingly. Technically, the stylus 200 of the invention is shortened to half a full-length at most.

FIG. 3A shows the stylus of the invention received inside a PDA. By injection molding, the PDA housing 300 is molded in an integrated appearance. A push portion 310 and a stylus slot 320 are simultaneously formed in the housing 300. Furthermore, a contact pad 311 is formed in the end of the push portion 310, and a retaining component to position the stylus 200 is also formed in the stylus slot 320. In this embodiment, a resisting plate 321 functions as the retaining component. When the stylus 200 is inserted into the stylus slot 320, the stylus 200 is slipped until the tip of the pen body 230 touching the resisting plate 321. If an external force is continuously applied to the pen shaft 210 (as the arrow shown in FIG. 3A), the spring 220 is compressed until the opening 231 holding the release button 211. The stylus 200 is therefore shortened.

However, the method for retaining the stylus of the invention is not limited hereto. In the other practical applications, the stylus 200 with particular exterior also can be well positioned in the stylus slot 320. For example, the upper end of the stylus 200 is thicker than the lower end and a protruding pin is further formed as a retaining component, so that the stylus 200 can be stuck in the stylus slot 320.

FIG. 3B is a partially enlarged view of the stylus in FIG. 3A. It clearly shows that the contact pad 311 is very close to the release button 211 while the stylus 200 is kept in the stylus slot 320 and the release button 211 is held by the opening 231. If the user wants to take the stylus 200 out, the first step is to press the push portion 310 and drive the contact pad 311 to free the release button 211 from the opening 231. Consequently, the recovery force of the elastic spring 220 ejects the pen shaft 210 upward; therefore, the stylus 200 is easily removed from the stylus slot 320.

In this disclosed embodiment, the PDA housing 300, the stylus slot 320, the resisting plate 321, and the push portion 310 are formed by injection molding and integrated as a whole.

According to the aforementioned descriptions, the retractable stylus of the invention has an advantage of saving space because the stylus placed in the slot is kept in a shortened condition. In the invention, the space actually taken by the retractable stylus is reduced, so that more space is saved and used for setting the electronic elements on the printed circuit board (PCB). This has great economical benefit for the costly PCB. In the PDA commercial market that pursues less weight and small size, the invention is an extremely valuable improvement. Besides, the push portion on the housing also enhances the PDA design, by which the contact pad can press the release button to extend the stylus. It is very easy for the user to remove the stylus out of PDA stylus slot.

While the invention has been described by way of example and in terms of the preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A retractable stylus, applied in a Personal Digital Assistant (PDA), comprising:
    a pen shaft having a release button on a circumferential periphery thereof;
    a pen body connected to the pen shaft and having an opening in a circumferential periphery thereof, wherein the opening is used for holding the release button at a first position;
    a spring situated inside the pen body and two ends of the spring respectively touching the pen shaft and the pen body for providing a force to extend the stylus; and
    a tip attached to an end of the pen body, the tip being adapted for tapping icons and buttons on the PDA;
    wherein when an external force is applied to the pen shaft downward, the spring is compressed until the opening holds the release button, thus the stylus is shortened; when the release button is pressed and set free from the opening, the spring elasticity ejects the pen shaft upward.

2. The retractable stylus according to claim 1, wherein the release button is trapeziform.

3. The retractable stylus according to claim 1, wherein the pen body has an additional opening in the circumferential periphery thereof, and the additional opening is used for holding the release button at a second position, wherein at the first position, the spring is relatively compressed and at the second position, the spring is relatively extended.

4. A Personal Digital Assistant (PDA) with retractable stylus, comprising:
    a retractable stylus, comprising:
    a pen shaft having a release button on a circumferential periphery thereof;
    a pen body connected to the pen shaft and having an opening in a circumferential periphery thereof, wherein the opening is used for holds the release button at a first position;
    a spring situated inside the pen body and two ends of the spring respectively touching the pen shaft and the pen body for providing a force to extend the stylus; and
    a tip attached to an end of the pen body, the tip being adapted for tapping icons and buttons on the PDA;
    wherein when an external force is applied to the pen shaft downward, the spring is compressed until the opening holding the release button, thus the stylus is shortened; when the release button is pressed and set free from the opening, the spring elasticity ejects the pen shaft upward;

a housing;

a stylus slot formed inside the housing for receiving the stylus;

a retaining component formed inside the stylus slot to position the stylus; and a push portion formed on the housing and including a contact pad attached to inner side of the push portion, wherein the contact pad is located at one side of the release button when the stylus is kept in the stylus slot, and wherein by pressing the push portion, the contact pad is driven to free the release button from the opening.

5. The PDA according to claim 4, wherein the housing, the stylus slot, the resisting plate, and the push portion are integrated as a whole by injection molding.

6. The PDA according to claim 4, wherein the release button is trapeziform.

7. The PDA according to claim 4, wherein the retaining component is a resisting plate.

8. The PDA according to claim 4, wherein an upper end of the pen body is thicker than a lower end.

9. The PDA according to claim 8, wherein the retaining component is a protruding pin.

10. The PDA according to claim 4, wherein the pen body has an additional opening in the circumferential periphery thereof, and the additional opening is used for holding the release button at a second position, wherein at the first position, the spring is relatively compressed and at the second position, the spring is relatively extended.

* * * * *